US010946568B2

(12) United States Patent
Recher et al.

(10) Patent No.: US 10,946,568 B2
(45) Date of Patent: Mar. 16, 2021

(54) FIELD JOINT COATING MATERIAL AND A PROCESS FOR MAKING A FIELD JOINT

(71) Applicant: RIMTEC CORPORATION, Tokyo (JP)

(72) Inventors: Gilles Recher, Marcq en Baroeul (FR); Sylvain Allain, Lille (FR); Frederic Demoutiez, Wasquehal (FR)

(73) Assignee: RIMTEC CORPORATION, Tokyo (JP)

( * ) Notice: Subject to any disclaimer, the term of this patent is extended or adjusted under 35 U.S.C. 154(b) by 0 days.

(21) Appl. No.: 15/381,911

(22) Filed: Dec. 16, 2016

(65) Prior Publication Data
US 2017/0144343 A1 May 25, 2017

Related U.S. Application Data

(63) Continuation-in-part of application No. 14/113,065, filed as application No. PCT/EP2012/060361 on Jun. 1, 2012, now abandoned.

(30) Foreign Application Priority Data

Jun. 9, 2011 (EP) .................................. 11290265

(51) Int. Cl.
| | | |
|---|---|---|
| B29C 45/14 | (2006.01) | |
| C09D 5/08 | (2006.01) | |
| C09D 163/00 | (2006.01) | |
| C09J 151/06 | (2006.01) | |
| F16L 58/18 | (2006.01) | |
| C08G 61/08 | (2006.01) | |

(Continued)

(52) U.S. Cl.
CPC ........ *B29C 45/14614* (2013.01); *C08G 61/08* (2013.01); *C09D 5/08* (2013.01); *C09D 163/00* (2013.01); *C09J 151/06* (2013.01); *F16L 58/10* (2013.01); *F16L 58/181* (2013.01); *B29K 2063/00* (2013.01); *B29L 2023/22* (2013.01); *C08G 2261/3324* (2013.01); *C08G 2261/3325* (2013.01); *C08G 2261/418* (2013.01); *F16L 13/0272* (2013.01)

(58) Field of Classification Search
CPC ................................................. B29C 45/14614
See application file for complete search history.

(56) References Cited

U.S. PATENT DOCUMENTS

| 6,264,871 B1 | 7/2001 | Mullen et al. |
| 2007/0034316 A1 | 2/2007 | Perez et al. |
| (Continued) | | |

FOREIGN PATENT DOCUMENTS

| EP | 0654632 B1 | 7/1998 |
| EP | 2042537 A1 | 4/2009 |
| (Continued) | | |

OTHER PUBLICATIONS

Machine Translation of Morita, JP 08-334196 A, Dec. 1996.*
(Continued)

*Primary Examiner* — Ryan M Ochylski
(74) *Attorney, Agent, or Firm* — Westerman, Hattori, Daniels & Adrian, LLP

(57) ABSTRACT

The invention relates to a field joint coating material based on a fast curable olefin liquid formulation and a process of making a field joint wherein this coating material is used.

13 Claims, 1 Drawing Sheet

(51) Int. Cl.
  *F16L 58/10* (2006.01)
  *F16L 13/02* (2006.01)
  *B29K 63/00* (2006.01)
  *B29L 23/00* (2006.01)

(56) References Cited

U.S. PATENT DOCUMENTS

| | | | |
|---|---|---|---|
| 2011/0105675 A1* | 5/2011 | Botros | B32B 27/08 524/517 |
| 2011/0297316 A1* | 12/2011 | Jackson | B29C 45/14336 156/330 |
| 2012/0270040 A1 | 10/2012 | Rule et al. | |
| 2015/0024007 A1 | 8/2015 | Nishioka et al. | |

FOREIGN PATENT DOCUMENTS

| | | | | |
|---|---|---|---|---|
| EP | 2280017 | A1 | 2/2011 | |
| GB | 2462149 | A | 2/2010 | |
| JP | 08-334196 | A | 12/1996 | |
| JP | 09-14574 | A | 1/1997 | |
| JP | 2001056090 | A | 2/2001 | |
| WO | 2008/042342 | A2 | 4/2008 | |
| WO | 2008/054602 | A2 | 5/2008 | |
| WO | WO 2009040135 | A1 * | 4/2009 | C08G 61/08 |
| WO | 2011/084418 | A1 | 7/2011 | |

OTHER PUBLICATIONS

International Search Report dated Nov. 15, 2012, issued in counterpart application No. PCT/EP2012/060361 (in English; 3 pages).
Database WPI, week 199713, Thomson Scientific, London, GB; AN 1997-135369, XP002457529, "Anti-corrosion protecting method for jacking pipe-by forming metal case on welding joint of jacking pipes with intermediate contg. norbomene gp. monomer metathesis catalyst, and activating agent" (in English; cited in ISR; corresponds to JP 09-014574A).
Ikeda, Shinataro et al., Database CA [online] Chemical Abstract Service, Columbus, Ohio, US; Mar. 28, 1997, "Corrosion prevention for underground pipes", XP002684850, retrieved from STN Database accession No. 1997:203766 (in English; cited in ISR).
Morita, Tooru, et al, Database CA [Online], Chemical Abstracts Service, Columbus, Ohio US; Mar. 1, 1997, "Method for prevention of corrosion of joints of metal pipes", XP002684851, retrieved from STM, Database accession No. 1997:134653 (in English; cited in ISR; corresponds to JP 08-334196A).
Office Action dated Jun. 16, 2016, issued in parent U.S. Appl. No. 14/113,065 (in English; 15 pages; including PTO-892 and returned PTO-SB08).
International Preliminary Report on Patentability dated Dec. 10, 2013, issued in counterpart application No. PCT/EP2012/060361 (in English; 7 pages; in parent U.S. Appl. No. 14/113,065).
Office Action, dated Mar. 18, 2019, issued in counterpart European Application No. 12726086.7 (in English; 4 pages).
Ni et al., "Enhancement of graft yield and control of degradation during polypropylene maleation in the presence of polyfunctional monomer", Journal of Applied Polymer Science, vol. 121, No. 5, pp. 2512-2517, Mar. 23, 2011 (in English; cited in European Office Action).
Office Action, dated Aug. 20, 2020, issued in counterpart European Application No. 12726086.7 (in English; 6 pages).
Tang et al., "Effect of Residual Maleic Anhydride in PP-g-MAH on the Thermo-Oxidative Aging Properties of RGF-PP", Journal of Materials Science and Chemical Engineering, vol. 5, No. 7, pp. 61-70, Jul. 13, 2017 (in English; cited in European Office Action).
Office Action, dated Oct. 13, 2020, issued in counterpart Brazilian Application No. BR112013026844-1 (w/ English machine translation; 9 pages).
Dow Chemical Co., "Amplify GR Functional Polymers", Amplify(TM) GR 204 Technical Information and Amplify(TM) GR 208 Technical Information, revised Sep. 16, 2020 and Jan. 11, 2012, respectively (in English; cited in Brazilian Office Action).

\* cited by examiner

FIELD JOINT COATING MATERIAL AND A PROCESS FOR MAKING A FIELD JOINT

This application is a continuation-in-part of U.S. application Ser. No. 14/113,065 filed Oct. 21, 2013, which is a U.S. national stage of International Application No. PCT/EP2012/60361 filed Jun. 1, 2012, each of which claims priority of European Patent Application No. 11290265.5 filed Jun. 9, 2011, the entire contents of each of which are hereby incorporated by reference.

The present invention relates to a field joint coating material based on a fast curable olefin liquid formulation and to a process of making a field joint for pipelines for use especially, but not exclusively, sub-sea and, more specifically, to a method of forming a field joint for pipelines which facilitates smooth reeling and laying of the pipelines.

BACKGROUND OF THE INVENTION

Pipelines, such as those used to carry oil or gas, are typically formed from many lengths of steel pipes which are factory-coated with a polymeric protective parent coating at a factory remote from the location at which they are to be laid.

At the factory, the parent coating is applied to the outside of the pipes leaving a short uncoated length of pipe at each end of the pipe. The uncoated ends enable the lengths of pipe to be welded together to form a pipeline.

The pipes are normally welded together as an integral part of the pipe laying process. Where this is carried out off shore the pipe welding would generally take place on a lay barge or a reel ship on a continuous basis.

In the case of insulated pipelines, the polymeric parent coating is usually few centimetres thick and generally based on solid, synthetic or foamed polymeric materials such as polypropylene and polyethylene. Typical actual coatings comprise layers of different materials to meet the specifications requested by deep water long distance connecting pipelines.

The welded ends of the individual lengths of pipe, known as field joints, must be coated to provide protection to the exposed pipe which is, ideally, equivalent to that of the factory applied parent coating which extends over the remainder of the pipe.

In addition, it is desirable for the field joints to be coated as quickly as possible since this affects the rate at which the pipeline can be laid. In addition the field joints should be solidified enough for the pipe to be laid without damaging the field joints on the laying equipment.

In conclusion a competitive field joint coating system should provide full compatibility, similar protection and insulation properties as the parent coating, being applied as quickly as possible even in large thickness and/or volume quantity, and solidify fast enough to allow the pipeline to be laid in the same time as the one used for the welding process itself.

Additionally it is advantageous for the field joint coating to exceed or offer at least similar performance as the parent coating in term of operating temperature and hydrolysis resistance. The market tendency is to operate at deeper and deeper level thus requesting higher operating temperature and therefore higher insulation performance and resistance to hydrolysis in higher temperature. Cost goes up with increased thickness of the coating.

A system of polypropylene injection on top of fusion bonded epoxy and adhesive has been developed which fully fuses the infill polypropylene to the parent coating thus eliminating any track for water to penetrate to the pipe surface. In addition, unlike polyurethanes, polypropylene is not subjected to hydrolysis. This normally provides total end to end integrity.

The infill polypropylene being a thermoplastic polymer still highly viscous when melted powerful injection equipment has to be used to be able to inject the melted polypropylene thermoplastic polymer, as well as very solid mould construction to be able to withstand the injection pressure. Typically the field joint coating can not be done in one single continuous operation and request multiple injections. To reduce the melted viscosity as much as possible, high temperature conditions have to be used, thus increasing the time needed to cool down and solidify the field joint. As a consequence, this type of system is not compatible with many offshore deep water pipe lay methods, when thick insulating pipe coating is requested.

Several methods have been proposed to meet the above criteria, and specifically to reduce the time needed to apply and solidify the field joint coating material without compromising on the protective properties. Most of them involve the use of a fast reacting thermoset polyurethane resin, alone or in combination with various other materials in order to improve adhesion of the polyurethane to the parent coating and/or resistance of the polyurethane to hydrolysis under pressure and temperature as it can be seen in the following patents and patent applications.

EP 0654632 titled "A method of filling a gap in a pipe coating" describes the use of corona or plasma discharge to enhance the surface energy of the polyolefin ends of the parent coating to provide better adhesion of thermoset polyurethane curable mixture.

U.S. Pat. No. 6,264,871 titled "Field joint" describes a specific design of a field joint facilitating smooth lying and providing mechanical connection of the curable polyurethane resin to the polyolefin parent coating ends.

GB 2462149 titled "Pipeline field joint having an epoxy layer extending between the existing coatings" describes the use of an adhesion primer extended from the cut side on one end to the cut side on the other end.

WO 2008/054602 titled "Pipeline field joint coating for wet insulation with improved adhesion" describes the use of specific heat treatment in order to improve adhesion and compatibility between thermoplastic polyolefin base parent coating and fast curing polyurethane field joint coating.

WO 2008/042342 titled "Pipeline field joint coating for wet insulation field joints" describes a method to protect a polyurethane field joint by a thermoplastic cover in order to prevent water ingress reaching the pipe surface and hydrolysis of the polyurethane wet insulation.

Hence there is still a need on the market for field joint coating process that combines short cycle times, chemical compatibility with olefin coating on the pipe, hydrolysis resistance at elevated temperatures, long term insulation properties and heat resistance. Existing systems offer only answers to some but not all of these requirements.

The present invention aims to provide an improved field joint which overcomes the limitations suffered by the currently known field joints. The present invention also aims to provide a method for producing an improved field joint.

In a first aspect, the present invention relates to a field joint coating material based on a fast curable olefin liquid formulation comprising:
 (i) at least one olefin monomer or at least one oligomer able to undergo polymerisation and optionally cross linking (ii) one catalytic system able to activate polymerisation and optionally cross linking process of the said monomer or oligomer.

Preferably, the monomer is a norbornene-type cycloolefin monomer. This monomer can be used alone or in combination with other olefin monomers. Most preferably, the norbornene-type cycloolefin monomer is dicyclopentadiene.

Further, the catalytic system contained in the field joint coating material according to the present invention is preferably a catalytic system that is able to activate Ring Opening Metathesis Polymerisation of a norbornene-type cycloolefin monomer and, most preferably, dicyclopentadiene.

According to a second aspect, the present invention relates to a process of making a field joint comprising the following steps:
(i) abrading or sand blasting a bare metal surface of a steel pipe;
(ii-1) applying a corrosion protective layer consisting of an epoxy primer, an epoxy phenol primer, or a fusion bonded epoxy on the bare metal surface, then applying an adhesive layer of a first olefin type adhesive on the corrosion protective layer, wherein the first olefin type adhesive is a modified linear low-density polyethylene resin or a modified polypropylene resin, having from 0.2% to 10% by mass of a maleic anhydride graft content, or
(ii-2) applying an adhesive layer of a second olefin type adhesive on the bare metal surface, wherein the second olefin type adhesive is a modified linear low-density polyethylene resin or modified polypropylene resin, having more than 4% by mass of a maleic anhydride graft content;
(iii) abrading and cleaning end cuts of parent coating resins;
(iv) placing a mould around the steel pipe in an area of the field joint to define a cavity between an internal surface of the mould and the field joint;
(v) injecting a field joint coating material based on a curable olefin liquid formulation in the cavity.

Preferably, said olefin type adhesive layer is a modified linear low-density polyethylene (LLDPE) resin or modified polypropylene resin having a maleic anhydride graft content above 4% by mass.

In another embodiment of the process according to the present invention, the mould is maintained under cooling to minimize the cycle time.

According to another embodiment, the mould is purged with nitrogen prior to the injection of the field joint material.

In still another embodiment, the surfaces of the end cuts of the parent coatings are heated prior to the injection of the field joint material.

BRIEF DESCRIPTION OF THE DRAWINGS

In FIG. 1, (1) denotes a steel pipe, (2) denotes a weld, (3) denotes a corrosion protective layer consisting of epoxy or epoxy phenol primer or fusion bonded epoxy (FBE), (3') denotes an adhesive layer, (4) denotes a first layer of solid polyethylene or polypropylene, (5) denotes a thick insulating polypropylene foam and (6) denotes a final solid or polyethylene or polypropylene layer.

DETAILED DESCRIPTION OF THE INVENTION

The present invention is based on the use of a fast curing liquid based olefin formulation to produce a field joint coating without the need to treat the thermoplastic or thermoset cut back of parent coating resins of the pipe either by applying a primer on the cut back surface or by increasing the surface energy by the means of a plasma or a corona treatment. The parent coating resin is factory-applied, and is a few centimeters thick and based on solid, synthetic, or foamed polymeric materials. After pipes welding and conventional preparation of the weld and the bare metal adjacent to the weld, epoxy primer or epoxy phenol primer is applied on the metal followed by the projection of the adhesive layer coat thus ensuring the continuity of the parent coating first 2 layers. After preparation of the cut back by simple cleaning and abrading a mould is put in place around the field joint area and the curable liquid formulation is injected by the means of an injection unit. Due to the liquid and non polar olefin nature of the curable formulation, perfect wetting and chemical welding is achieved after curing between the polyolefin layers of the parent coating and the cured ("polymerized") olefin formulation, thus preventing water ingress and hydrolysis leading to in service field joint deterioration.

Additionally the curable formulation catalytic system can be adjusted to offer curing time compatible to any size of field joint coating. Due to the very low viscosity of the curable olefin formulation simple and fast operated mould can be used for injecting the said curable olefin formulation.

Additionally the high heat deflection temperature achieved by the curable formulation after curing and the possibility to use a water cooling system on the mould reduce the cycle time to minutes even when the coating is thicker than 50 mm.

Figure 1:
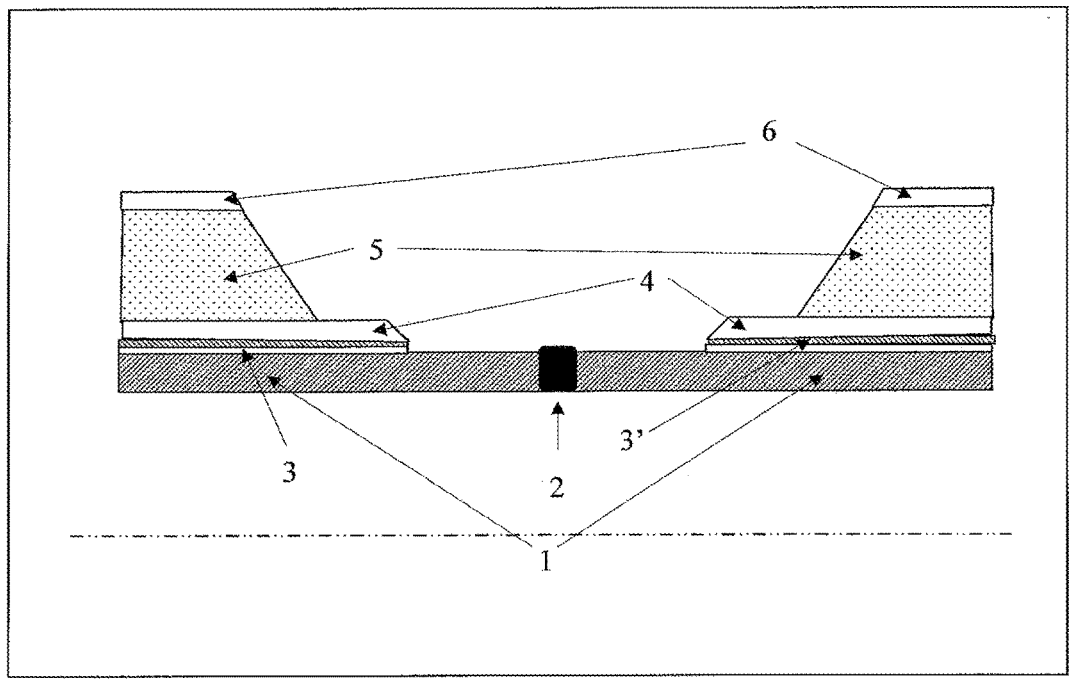
FIG. 1: Schematic representation of a field joint. For the sake of clarity the second arrow of layer 3 and 3' are not represented but it should be understood that the figure is symmetrical.
Figure 2:
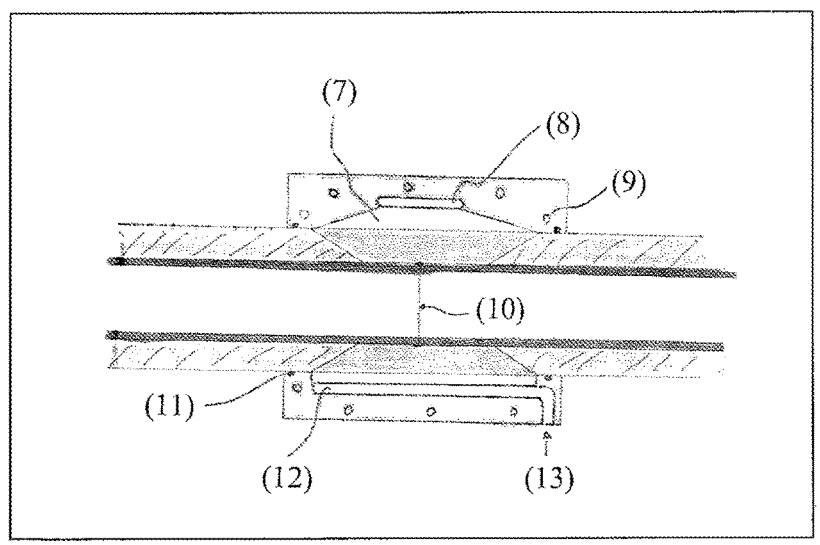
FIG. 2: Schematic representation of a mould used in the method of forming a field joint. (7) denotes a flash, (8) denotes a vent, (9) denotes a water channel for water having a temperature in the range of typically 20° C. to 40° C., (10) denotes the welded location, (11) denotes a sealing gasket, (12) denotes a gate and (13) denotes a mix head location.

Referring to FIG. 1 a pipeline field joint is formed between two lengths of steel pipe (1) welded together at weld (2). Each length of pipe (1) is coated with a factory applied coating comprising a corrosion protective layer (3) consisting of epoxy or epoxy phenol primer or fusion bonded epoxy (FBE), an adhesive layer (3'), a first layer of solid polyethylene or polypropylene (4), a thick insulating polypropylene foam (5) and a final solid or polyethylene or polypropylene layer (6). The factory applied coatings (3), (3'), (4), (5), (6) on each length has been cut back to form a double chamfer and leave the steel pipe exposed in the region of the weld.

It is to be understood that the scope of the invention is not limited to the example above and that the factory applied coating can take any suitable form and may comprise a single polypropylene layer—coating (3), (3') and (4)—or two polypropylene layers—coating (3), (3'), (5) and (6). Also, the factory applied parent coating may be cut back in any suitable way. In accordance to well known methods after the two lengths of pipe have been welded together the exposed steel pipe and adjacent factory coating are cleaned. Several different cleaning processes may be employed to clean the joint, for example the exposed steel surface may be blast cleaned using abrasive particles and the polypropylene coated surfaces may be cleaned and abraded using a powered abrasive disc. The entire joint area may then be blown clean with compressed air in order to remove any dust particles. Typical cleaning complies with a standard of SA2 to SA3 (BS7079).

An epoxy primer or epoxy phenol primer or a fusion bond epoxy is then applied on the bare metal preliminary heated by an induction heating coil to the suitable temperature. In practice the end of the polypropylene factory coatings—(4), (5), (6)—are protected during the corrosion protective coating (3) application that usually extends from one end of the factory applied coating (3) to the other end to form a continuous coating. Typical primer coating thickness is 250 micrometers.

This operation is followed by the application of an adhesive tie layer (3') in the same conditions as for the parent coating, having a typical thickness of 500 microns. The adhesive tie layer coating could be of any of the conventionally available type for this application providing it is compatible with the chosen corrosion protective coating applied underneath.

Advantageously the adhesive layer can be chosen from the family of modified linear low-density polyethylene (LLDPE) resins or modified polypropylene resins. Typical modifications include grafting the linear chain by maleic anhydride grafting, in content ranging from 0.2% by mass to 10% by mass.

Advantageously the adhesive layer is a modified linear low-density polyethylene (LLDPE) resins or modified polypropylene resins having a grafting content above 4% by mass, thus avoiding the need of a corrosion protection epoxy or epoxy phenol primer.

It is clear from the above description that prior to the injection of the liquid curable olefin formulation all the external surfaces are now polyolefin based polymer materials.

A cylindrical mould is then located around the field joint coating and close tight around the external polypropylene surface (6) of the pipe. The mould is thermally controlled at 20° C. to provide a fast cooling.

Commercially available Telene® 1650 A and B formulation is then injected into the cavity defined by the inner wall of the mould and the external surface of the various layer composing the cut back of the pipe ends by the mean of an Cannon A 100 RIM injection unit equipped with an FPL 18 mixhead. The formulation is allowed to cure for 5 minutes before the mould is removed. The flashes are removed and the pipeline is move by one step to allow the next field joint to be coated.

It is understood that a wide variety of fast curable formulations can be used. Such a curable olefin base formulation is typically a 2 or 3 components system but single component system can also be formulated.

Because of its intrinsic nature of being based on olefin monomers, the fast curable formulation wets easily the non polar or slightly polar surface of the various olefin based material surface. The curing process can be chemically described as a combination of polymerization and optionally cross linking of the olefin monomers composing the formulation activated by the mean of a catalytically species. As the monomer unit can diffuse into the olefin based materials that compose the various layers 3', 4, 5 and 6, an interpenetrated polymer network is created in the various interface leading to a strong water tight non polar connection between the various material and the cured formulation that can be described as a "chemical welding".

Advantageously the surfaces of the end cuts of the parent coatings are preheated to 30 to 60° C. prior to the injection of the curable formulation in order to increase the mobility of the polymer chain therefore increasing the thickness of the chemical welding obtained after curing the formulation.

The type of formulation that can be used in the invention comprises at least one cyclo-olefin monomer or oligomer, a Ring Opening Metathesis Polymerisation (ROMP) catalytic system and various additives controlling the reaction or modifying the final polymer properties. It is understood that in the case of using oligomer precursors in the curable formulation the viscosity of the formulation is still low enough to allow the use of low viscosity equipment known as RTM or RIM injection unit.

Depending on the target final properties of the field joint the cyclo-olefin monomer or oligomer can have mono or multiple reactive double bonds thus polymerising into either thermoset or thermoplastic polymer.

Advantageously the catalytic system used in the formulation according to the invention is a ring opening metathesis catalyst based on Molybdenum, Tungsten, Ruthenium or Osmium complexes.

Catalysts based on ruthenium complexes are suitable for use as the ring opening metathesis catalyst in the formulation of this invention. As the ruthenium-based complex, compounds represented by the general formula (1) or general formula (2) shown below are suitable.

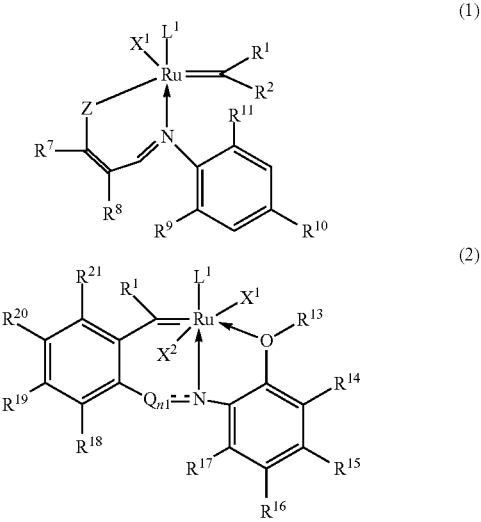

The general formula (1) is shown below.

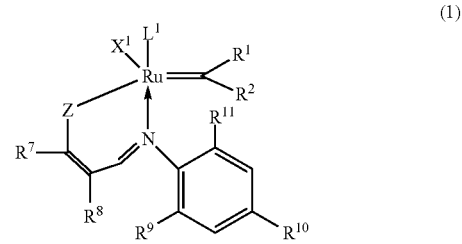

In the general formula (1), Z indicates an oxygen atom, sulfur atom, selenium atom, $NR^{12}$, $PR^{12}$, or $AsR^{12}$, $R^{12}$ indicates a hydrogen atom;

halogen atom; or $C_1$ to $C_{20}$ organic group which may contain a halogen atom, oxygen atom, nitrogen atom, sulfur atom, phosphorus atom, or silicon atom, but since the effect of the present invention becomes much more remarkable, as Z, an oxygen atom is preferable.

$R^1$ and $R^2$ respectively independently indicate a hydrogen atom; halogen atom; or $C_1$ to $C_{20}$ organic group which may contain a halogen atom, oxygen atom, nitrogen atom, sulfur atom, phosphorus atom or silicon atom, where these groups may be substituted and, further, may bond together to form rings. As examples where $R^1$ and $R^2$ bond together to form rings, a phenylindenylidene group or other indenylidene group which may be substituted may be mentioned.

As specific examples of the $C_1$ to $C_{20}$ organic group which may contain a halogen atom, oxygen atom, nitrogen atom, sulfur atom, phosphorus atom, or silicon atom, a $C_1$ to $C_{20}$ alkyl group, $C_2$ to $C_{20}$ alkenyl group, $C_2$ to $C_{20}$ alkynyl group, $C_6$ to $C_{20}$ aryl group, $C_1$ to $C_{20}$ alkoxy group, $C_2$ to $C_{20}$ alkenyloxy group, $C_2$ to $C_{20}$ alkynyloxy group, $C_6$ to $C_{20}$ aryloxy group, $C_1$ to $C_8$ alkylthio group, carbonyloxy group, $C_1$ to $C_{20}$ alkoxycarbonyl group, $C_1$ to $C_{20}$ alkylsulfonyl group, $C_1$ to $C_{20}$ alkylsulfinyl group, $C_1$ to $C_{20}$ alkylsulfonic acid group, $C_6$ to $C_{20}$ arylsulfonic acid group, phosphonic acid group, $C_6$ to $C_{20}$ arylphosphonic acid group, $C_1$ to $C_{20}$ alkylammonium group, $C_6$ to $C_{20}$ arylammonium group, etc. may be mentioned. These $C_1$ to $C_{20}$ organic groups which may contain a halogen atom, oxygen atom, nitrogen atom, sulfur atom, phosphorus atom, or silicon atom may be substituted. As examples of the substituent, a $C_1$ to $C_{10}$ alkyl group, $C_1$ to $C_{10}$ alkoxy group, $C_6$ to $C_{10}$ aryl group, etc. may be mentioned.

$X^1$ and $X^2$ respectively independently indicate any anionic ligand. An "anionic ligand" is a ligand which has a negative charge when separated from the center metal atom. For example, a halogen atom, diketonate group, substituted cyclopentadienyl group, alkoxyl group, aryloxy group, carboxyl group, etc. may be mentioned.

$L^1$ indicates a hetero atom-containing carbene compound or a neutral electron donor compound other than a hetero atom-containing carbene compound. The hetero atom-containing carbene compound and neutral electron donor compound other than a hetero atom-containing carbene compound are compounds which have neutral charges when separated from the center metal. From the viewpoint of improvement of the catalyst activity, a hetero atom-containing carbene compound is preferable. A "hetero atom" means an atom of Group XV and Group XVI of the Periodic Table.

Specifically, a nitrogen atom, oxygen atom, phosphorus atom, sulfur atom, arsenic atom, selenium atom, etc. may be mentioned. Among these, from the viewpoint of a stable carbene compound being obtained, a nitrogen atom, oxygen atom, phosphorus atom, and sulfur atom are preferable and a nitrogen atom is particularly preferable.

As the hetero atom-containing carbene compound, a compound of the following general formula (3) or (4) is preferable. From the viewpoint of improvement of the catalyst activity, a compound of the following general formula (3) is particularly preferable.

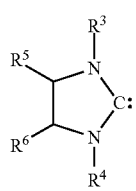

(3)

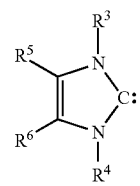

(4)

where in the general formulas (3) and (4), $R^3$, $R^4$, $R^5$, and $R^6$ respectively independently indicate a hydrogen atom; halogen atom; $C_1$ to $C_{20}$ organic group which may contain a halogen atom, oxygen atom, nitrogen atom, sulfur atom, phosphorus atom, or silicon atom. The specific examples of the $C_1$ to $C_{20}$ organic group which may contain a halogen atom, oxygen atom, nitrogen atom, sulfur atom, phosphorus atom, or silicon atom are the same as the case of the general formulas (1) and (2).

Note that, $R^1$, $R^2$, $X^1$, and $L^1$ in general formulas (1) and (2) may respectively independently and/or in any combination bond together to form multi-dentate chelate ligands, but preferably $X^1$ and $L^1$ do not form multi-dentate chelate ligands and $R^1$ and $R^2$ bond together to form a ring. More preferably $R^1$ and $R^2$ bond together to form an indenylidene group which may be substituted, particularly preferably a phenylindenylidene group.

In the general formula (1), $R^7$ and $R^8$ respectively independently indicate a hydrogen atom, $C_1$ to $C_{20}$ alkyl group, $C_2$ to $C_{20}$ alkenyl group, or $C_6$ to $C_{20}$ heteroaryl group. These groups may be substituted and, further, may bond together to form rings. As examples of the substituents, a $C_1$ to $C_{10}$ alkyl group, $C_1$ to $C_{10}$ alkoxy group, or $C_6$ to $C_{10}$ aryl group may be mentioned. The ring in the case of forming a ring may be any of an aromatic ring or aliphatic ring and hetero ring, but forming an aromatic ring is preferable, forming a $C_6$ to $C_{20}$ aromatic ring is more preferable, and forming a $C_6$ to $C_{10}$ aromatic ring is particularly preferable.

In the general formula (1), $R^9$, $R^{10}$, and $R^{11}$ respectively independently indicate a hydrogen atom; halogen atom; or $C_1$ to $C_{20}$ organic group which may contain a halogen atom, oxygen atom, nitrogen atom, sulfur atom, phosphorus atom, or silicon atom. These groups may be substituted and may bond together to form rings. Further, the specific examples of the $C_1$ to $C_{20}$ organic group which may contain a halogen atom, oxygen atom, nitrogen atom, sulfur atom, phosphorus atom, or silicon atom are the same as described above.

$R^9$, $R^{10}$, and $R^{11}$ are each preferably a hydrogen atom or $C_1$ to $C_{20}$ alkyl group, particularly preferably a hydrogen atom or $C_1$ to $C_3$ alkyl group.

Note that, as the specific examples of the compounds of the general formula (1) and methods of production of the same, for example, the ones described in WO2003/062253 (Japanese Patent Publication No. 2005-515260A) and US2015/0240007 etc. may be mentioned.

The general formula (2) is shown below.

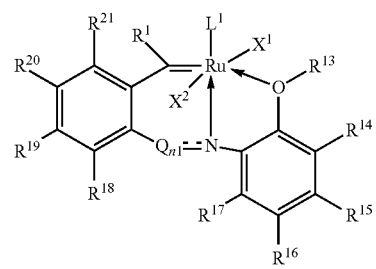

(2)

In the general formula (2), m is 0 or 1 and m is preferably 1. In that case, Q is an oxygen atom, nitrogen atom, sulfur atom, methylene group, ethylene group, or carbonyl group, preferably is a methylene group.

--- is a single bond or double bond and preferably is a single bond.

$R^1$, $X^1$, and $L^1$ are the same as the case of the general formula (1), and may respectively independently and/or in any combination bond together to form multi-dentate chelate ligands, but preferably $X^1$, $X^2$, and $L^1$ do not form multi-dentate chelate ligands and $R^1$ is a hydrogen atom. $X^2$ is the same as $X^1$ of the general formula (1).

$R^{13}$ to $R^{21}$ are each a hydrogen atom; halogen atom; or $C_1$ to $C_{20}$ organic group which may contain a halogen atom, oxygen atom, nitrogen atom, sulfur atom, phosphorus atom, or silicon atom. These groups may be substituted and may bond together to form rings. Further, the specific examples of the $C_1$ to $C_{20}$ organic group which may contain a halogen atom, oxygen atom, nitrogen atom, sulfur atom, phosphorus atom, or silicon atom are the same as the case of the general formula (1).

$R^{13}$ is preferably a $C_1$ to $C_{20}$ alkyl group, more preferably a $C_1$ to $C_3$ alkyl group, $R^{14}$ to $R^{17}$ are each preferably a hydrogen atom, and $R^{18}$ to $R^{21}$ are each preferably a hydrogen atom or halogen atom.

Note that, as the specific examples of the compounds of the general formula (2) and methods of production of the same, for example, the ones described in WO2011/079799 (Japanese Patent Publication No. 2013-516392A) and US2015/0240007 etc. may be mentioned.

Among compounds having the general formula (1) or the general formula (2), compounds having the general formula (5) (VC843) or the general formula (6) (Zhan 1N) shown below are preferable:

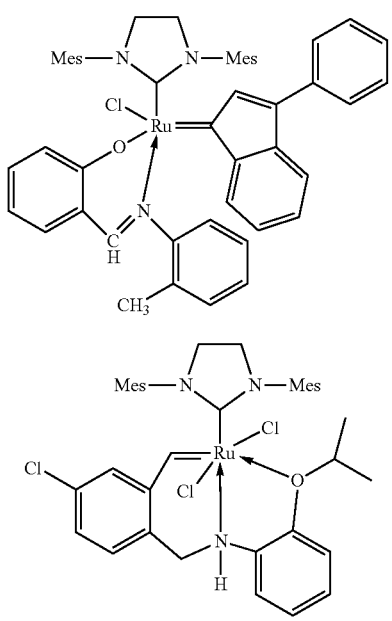

The amount of use of the metathesis polymerization catalyst is usually 0.01 mmole or more with respect to 1 mole of the monomer used for the reaction, preferably 0.1 to 50 mmoles, more preferably 0.1 to 20 mmoles. By making the amount of use of the metathesis polymerization catalyst in the above range, it is possible to balance the reactivity and storage stability of the obtained polymerizable composition to a high level. A further detailed description of the type of olefin monomers, additives and catalyst that can be used in the present invention is included in the application published under EP 2 042 537 from the same applicant, which is herein incorporated by reference.

Advantageously the mould is purged by nitrogen gas prior to the injection when using formulation activated by a tungsten type ROMP catalyst.

Advantageously the curable formulation is selected such as to provide a thermoset polyolefin having a glass transition temperature of more than 140° C. after curing thus offering the same service temperature of the pipeline as the one offered by the parent coating.

The invention claimed is:

1. A process of coating a field joint on a steel pipe having at least two pipe sections joined to each other, the process comprising the following steps:
   (i) abrading or sand blasting a bare metal surface of the steel pipe at a position of the field joint;
   (ii) applying a corrosion protective layer consisting of a fusion bonded epoxy on the bare metal surface, then applying an adhesive layer directly on the corrosion protective layer without an intervening layer of epoxy material, wherein the adhesive layer is of an olefin type adhesive is a modified linear low-density polyethylene resin or a modified polypropylene resin, having from 0.2% to 10% by mass of a maleic anhydride graft content;
   (iii) abrading and cleaning end cuts of factory applied parent coating resins;
   (iv) placing a mould around the steel pipe in an area of the field joint to define a cavity between an internal surface of the mould and the field joint;
   (v) injecting a field joint coating material based on a curable olefin liquid formulation in the cavity;
   wherein the field joint coating material comprises:
   (a) at least one olefin monomer or at least one oligomer able to undergo polymerization and optionally crosslinking, and
   (b) a catalytic system able to activate the polymerization and optionally the crosslinking of the at least one olefin monomer or the at least one oligomer.

2. The process according to claim 1, wherein the catalytic system is adapted to activate ring opening metathesis polymerization of a norbornene-type cycloolefin monomer.

3. The process according to claim 1, wherein the mould is maintained under cooling to minimize a cycle time for the process.

4. The process according to claim 1, further comprising purging the mould with nitrogen prior to the injecting of the field joint coating material.

5. The process according to claim 1, further comprising heating surfaces of the end cuts of the parent coating resins prior to the injecting of the field joint coating material.

6. The process according to claim 1, wherein the catalytic system comprises a compound represented by the following formula (1):

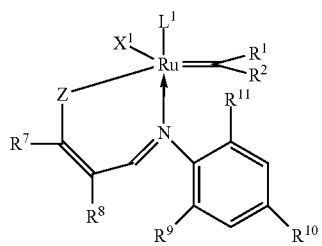

(1)

where
Z indicates an oxygen atom, sulfur atom, selenium atom, $NR^{12}$, $PR^{12}$, or $AsR^{12}$, where $R^{12}$ indicates a hydrogen atom; halogen atom; or one selected from the group consisting of $C_1$ to $C_{20}$ organic groups which may contain at least one atom selected from the group consisting of halogen atom, oxygen atom, nitrogen atom, sulfur atom, phosphorus atom, and silicon atom;

$R^1$ and $R^2$ respectively independently indicate a hydrogen atom; halogen atom; or one selected from the group consisting of $C_1$ to $C_{20}$ organic groups which may contain at least one atom selected from the group consisting of halogen atom, oxygen atom, nitrogen atom, sulfur atom, phosphorus atom and silicon atom, where the groups may be substituted and, further, may bond together to form rings;

$X^1$ indicates any anionic ligand;

$L^1$ indicates a hetero atom-containing carbene compound or a neutral electron donor compound other than a hetero atom-containing carbene compound;

where $R^1$, $R^2$, $X^1$, and $L^1$ may respectively independently and/or in any combination bond together to form multidentate chelate ligands;

$R^7$ and $R^8$ respectively independently indicate a hydrogen atom, or one selected from the group consisting of $C_1$ to $C_{20}$ alkyl groups, $C_2$ to $C_{20}$ alkenyl groups, and $C_6$ to $C_{20}$ heteroaryl groups, where the groups may be substituted and, further, may bond together to form rings; and $R^9$, $R^{10}$, and $R^{11}$ respectively independently indicate a hydrogen atom; halogen atom; or one selected from the group consisting of $C_1$ to $C_{20}$ organic groups which may contain at least one atom selected from the group consisting of halogen atom, oxygen atom, nitrogen atom, sulfur atom, phosphorus atom, and silicon atom, where the groups may be substituted and may bond together to form rings.

7. The process according to claim 6, wherein the compound of formula (1) is the compound having the general formula (5):

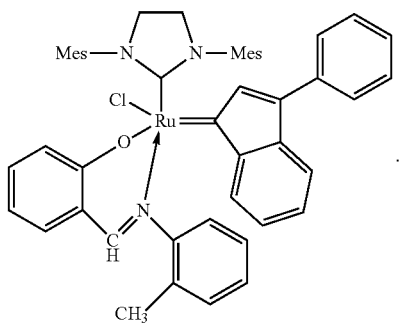

(5)

8. The process according to claim 1, wherein the catalytic system comprises a compound represented by the following formula (2):

(2)

where
m is 0 or 1;
O is an oxygen atom, nitrogen atom, sulfur atom, methylene group, ethylene group, or carbonyl group;
--- is a single bond or double bond;
$R^1$ indicates a hydrogen atom; halogen atom; or one selected from the group consisting of $C_1$ to $C_{20}$ organic groups which may contain at least one atom selected from the group consisting of halogen atom, oxygen atom, nitrogen atom, sulfur atom, phosphorus atom and silicon atom, where these groups may be substituted and, further, may bond together to form rings;
$X^1$ and $X^2$ respectively independently indicate an anionic ligand;
$L^1$ indicates a hetero atom-containing carbene compound or a neutral electron donor compound other than a hetero atom-containing carbene compound;
where $R^1$, $X^1$, and $L^1$ may respectively independently and/or in any combination bond together to form multidentate chelate ligands; and
$R^{13}$ to $R^{21}$ are each a hydrogen atom; halogen atom; or one selected from the group consisting of $C_1$ to $C_{20}$ organic groups which may contain at least one atom selected from the group consisting of halogen atom, oxygen atom, nitrogen atom, sulfur atom, phosphorus atom, and silicon atom, where the groups may be substituted, and further, may bond together to form rings.

9. The process according to claim 8, wherein the compound of formula (2) is the compound having the general formula (6):

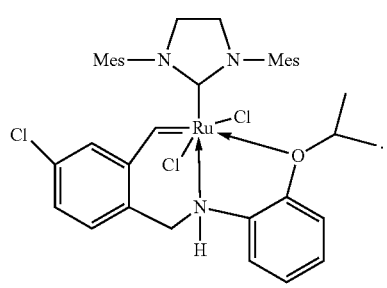

(6)

10. The process according to claim 1, wherein the at least one olefin monomer is a norbornene-type cycloolefin monomer.

11. The process according to claim 10, wherein the at least one olefin monomer is dicyclopentadiene.

12. The process according to claim 1, wherein an entirety of the adhesive layer is in direct contact with the corrosion protective layer.

13. The process according to claim 1, wherein an entirety of the adhesive layer overlaps with the corrosion protective layer.

* * * * *